US012018771B2

(12) United States Patent
Thurston et al.

(10) Patent No.: US 12,018,771 B2
(45) Date of Patent: Jun. 25, 2024

(54) VARIABLE FLOW ADJUSTABLE VALVES

(71) Applicant: SETBC, LLC, San Diego, CA (US)

(72) Inventors: Edwin Thurston, San Diego, CA (US); David Burney, Ramona, CA (US)

( * ) Notice: Subject to any disclaimer, the term of this patent is extended or adjusted under 35 U.S.C. 154(b) by 0 days.

(21) Appl. No.: 17/732,352

(22) Filed: Apr. 28, 2022

(65) Prior Publication Data
US 2022/0397212 A1    Dec. 15, 2022

Related U.S. Application Data

(63) Continuation of application No. 17/347,560, filed on Jun. 14, 2021, now abandoned, and a continuation of application No. 17/347,538, filed on Jun. 14, 2021, now abandoned.

(51) Int. Cl.
| | |
|---|---|
| *F16K 31/53* | (2006.01) |
| *F16K 3/08* | (2006.01) |
| *F16K 3/34* | (2006.01) |
| *F16K 31/04* | (2006.01) |
| *F16K 37/00* | (2006.01) |
| *G05D 7/06* | (2006.01) |

(52) U.S. Cl.
CPC ............ *F16K 31/535* (2013.01); *F16K 3/085* (2013.01); *F16K 3/34* (2013.01); *F16K 31/041* (2013.01); *F16K 37/0016* (2013.01); *G05D 7/0635* (2013.01)

(58) Field of Classification Search
CPC ..... G05D 7/0635; F16K 31/04; F16K 37/005; F16K 3/085; F16K 31/535; F16K 3/34; F16K 37/0016
See application file for complete search history.

(56) References Cited

U.S. PATENT DOCUMENTS

| | | | |
|---|---|---|---|
| 1,947,637 | A | 2/1934 | Bolster |
| 2,101,356 | A | 4/1937 | Zak |
| 2,554,040 | A | 5/1951 | Long |
| 2,564,223 | A | 8/1951 | Long |
| 3,590,861 | A | 7/1971 | Chittenden et al. |
| 5,308,040 | A | 5/1994 | Torres |
| 5,365,978 | A | 11/1994 | Woods |
| 7,218,211 | B2 | 5/2007 | Ho |
| 7,261,276 | B1 | 8/2007 | Taylor |
| 8,251,088 | B2 | 8/2012 | Wark |
| 8,613,607 | B2 | 12/2013 | Darsey |
| 2015/0088321 | A1* | 3/2015 | Schmidt ................ G05B 13/02 700/282 |
| 2021/0199213 | A1 | 7/2021 | Knupfer et al. |
| 2021/0247084 | A1* | 8/2021 | Vanderplaat ......... F24F 11/0008 |

FOREIGN PATENT DOCUMENTS

DE          19840704 A     5/2002

\* cited by examiner

*Primary Examiner* — Atif H Chaudry
(74) *Attorney, Agent, or Firm* — Barcelo, Harrison & Walker, LLP; Joshua C. Harrison

(57) ABSTRACT

An adjustable rotary flow valve, comprising: a body; an upstream port; a downstream port; a rotary disc comprising a water flow opening; a rotating mechanism couple with the rotary disc and configured to move the water flow opening past a plurality of channels in a flow of water from the downstream port to the upstream port so as to variably restrict the flow; dial graduations that illustrate a plurality of flow percentage; and a dial couple with the rotating mechanism and configured to illustrate via the dial graduations the current flow percentage based on a position of the rotary disc.

3 Claims, 8 Drawing Sheets

VARIABLE FLOW ADJUSTABLE VALVES

TECHNICAL FIELD

The embodiments described herein are generally directed to variable flow adjustable valves, and more particularly, to variable flow adjustable valves that can be easily adjusted for optimized water flow, particularly in residential environments.

BACKGROUND

Fresh water is a limited resource and water conservation is increasingly important as the population continues to expand, and as a changing climate make some areas more arid. In the United States, and globally, dams, reservoirs, and levees are often not viewed positively and construction of such has been falling. Moreover, older dams and other water infrastructure is aging, exacerbating concerns over sustainability and the need for conservation.

Agriculture consumes the lions share of fresh water resources globally, and a lot of resources are continually brought to bear in order to make agriculture more sustainable in terms of water consumption. But for citizens in the developed world, a significant amount of water is consumed irrigating both commercial and residential landscapes. Unfortunately, landscape irrigation is very inefficient and a large portion of the water used for irrigation is wasted due excessive runoff, over watering, and evaporation.

Most commercial and residential properties have a main, metered water line. Having an adjustable flow restriction on the main line is not uncommon, but most are not easily adjusted in the mid to low range to suit the needs of the landscape. Nor are their settings definable to measure a need to increase or decrease with time and experience of plant growth. Consequently, commercial and residential property owners do not have an effective way to monitor and adjust the flow of water through the mainline.

SUMMARY

According to one aspect, An adjustable rotary flow valve, comprises a body; an upstream port; a downstream port; a rotary disc comprising a water flow opening; a rotating mechanism couple with the rotary disc and configured to move the water flow opening past a plurality of channels in a flow of water from the downstream port to the upstream port so as to variably restrict the flow; dial graduations that illustrate a plurality of flow percentage; and a dial couple with the rotating mechanism and configured to illustrate via the dial graduations the current flow percentage based on a position of the rotary disc.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
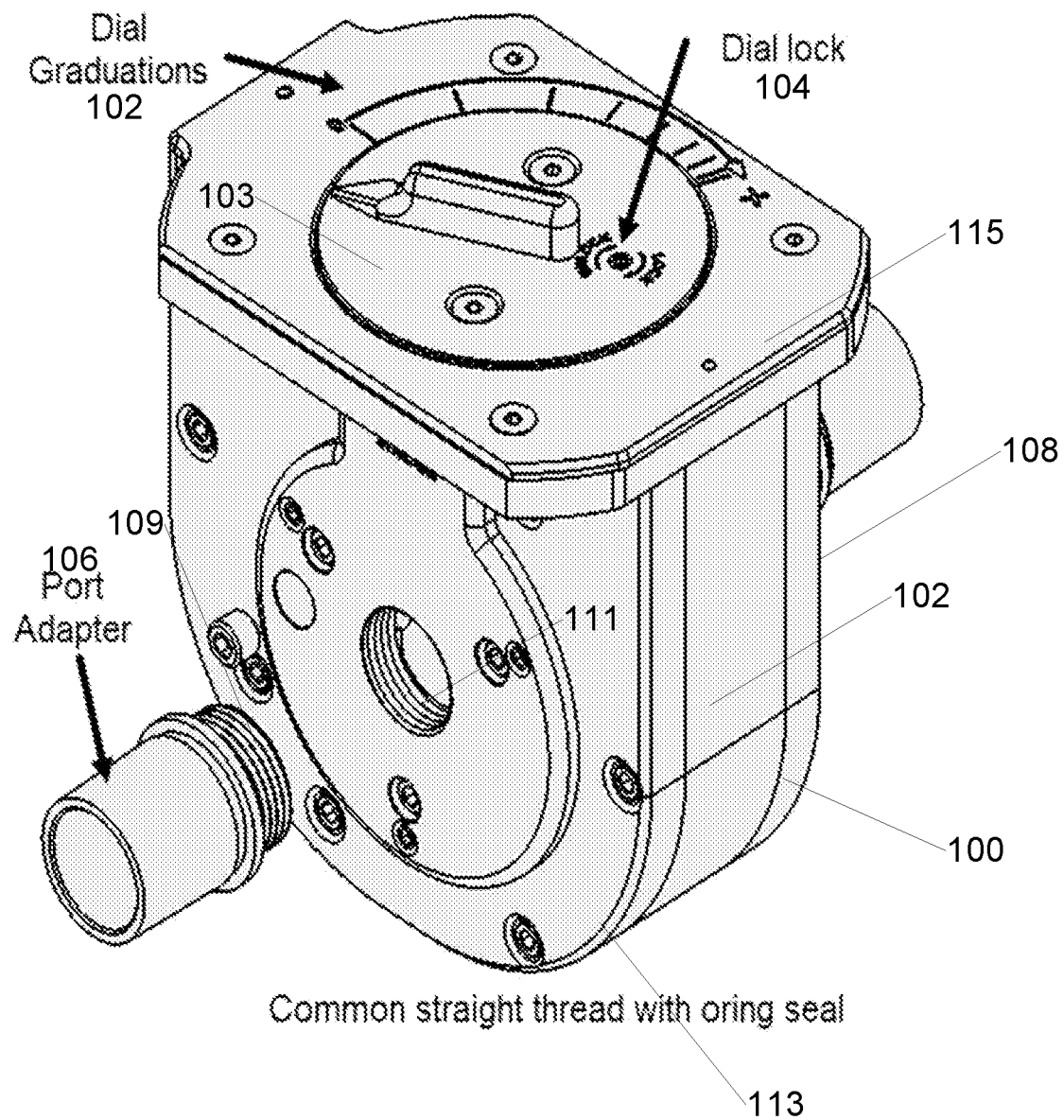
FIG. 1 illustrates a variable flow, adjustable valve in accordance with one example embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" or "forward" and "aft" are relative to the flow direction of through a min line, unless specified otherwise. It should be understood that "upstream-refers to the inlet flow side of the valve, and "downstream" refers to the outlet flow side of the valve.

In addition, it should also be understood that the various components illustrated herein are not necessarily drawn to scale. In other words, the features disclosed in various embodiments may be implemented using different relative dimensions within and between components than those illustrated in the drawings.

FIG. 1 illustrates a variable flow, adjustable valve 100 in accordance with one example embodiment. As can be seen, valve 100 has a front portion 113 (upstream) and back portion 108 (downstream), each with a port adapter 106 for coupling with the main line, a body 100, and a lid 115. As can be seen, the ports 106 can be removable, e.g., via a threaded male portion 109 that mates with a threaded female receptacle 111 in both the front and back portions 113 and 108 adapter enable either male National Pipe Thread (NPT), Female NPT, Copper sweat, PVC glue socket, etc., connection to the main line and enabling different materials to be used for the connection port adapter. An O-ring seal (not shown) can be used to seal the interface between adaptor 106 and receptacle 111.

Lid 115 comprises a dial 103 that controls a rotating orifice plate within body 102 as described below. Dial graduations 102 can also be included and indicate relative flow rates from open to closed starting at the closed position. The dial graduations can be designed with 100 psi flows through empirical testing at different back pressure downstream. A dial lock 104 can be included to lock the rotating orifice plate in place. The dial lock can comprise a hex socket set screw.

Figure 2:
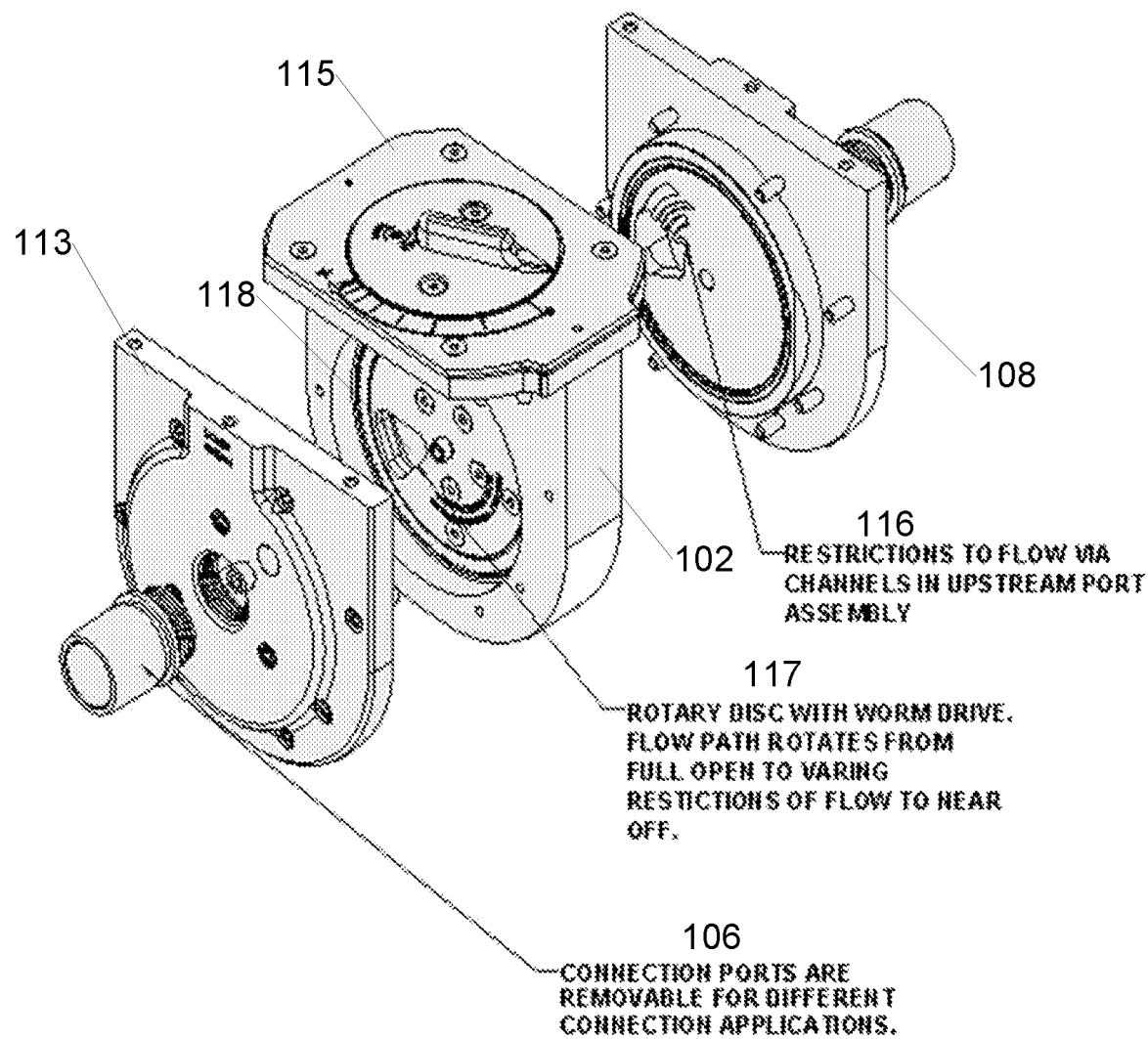
FIG. 2 illustrates an exploded view of the valve of FIG. 1, according to an example embodiment.

As can be seen in FIG. 2, body 102 can house rotary disc 117 that, e.g., comprises a worm gear such that disc 117 can be rotated under the control of dial 103 via a pinion and spur gear under dial 103. Disc 117 can be configured to rotate such that the flow path 118 moves past port flow channels (or openings) 116 in back portion 108 providing different flow rates, e.g., from full open to near off, with rotation. Flow at low end of scale can have a more gradual reduction. Adjustment dial 103 is lockable in any position via set screw (not shown) as described above. The dial graduations 102 approximate flow % with rotation starting at no flow or near no flow.

Other embodiments can use cables or other transmission methods in order to get an adjustment dial 103 large enough to see graduations easily at 90 degree axis from the rotating disc inside. A key is the larger dial 103 for easier reading and a rotating disc with flow features.

Figure 3:
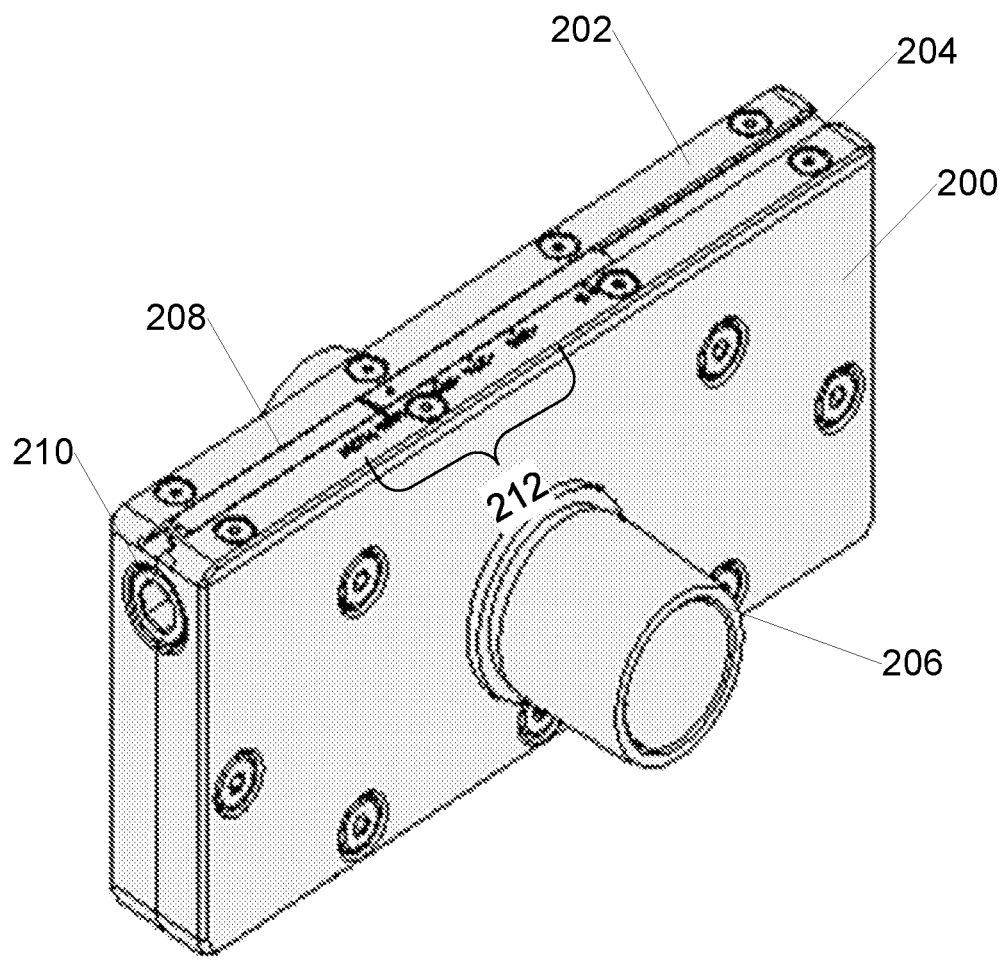
FIG. 3 illustrates a variable flow, adjustable valve in accordance with another example embodiment.

FIG. 3 illustrates a variable flow, adjustable valve 200 in accordance with another example embodiment. As can be seen, valve 200 can comprise a front portion 204, a back portion 202, and a central plate 208. Front portion 204 and back portion 202 can comprise removable ports 206, which can be similar to removal ports 106 described above. As described in detail below, valve 200 comprises an internal slide plate that controls the flow. The slide plate moves via screw rotation via an internal bolt that can be turned via bolt access port 210 on the side of valve 200. The bolt can be configured such that fine adjustment is made easier by requiring multiple revolutions between each scale graduation 212. An interior seal will prevent the bolt from shifting without a wrench over time.

Central plate 208 can be included that moves with the slide plate, and can provide debris cover and provide a reference line that indicates the graduation setting. As illustrated below, plate 208 can be attached directly to the central slide plate via, e.g., dowel pin or screw. Front and back portions 204 and 202 can comprise guide rails to again reduce debris from entering valve 200 and to guide the central plate 208.

Front 204 can be, e.g., engraved with graduations 212 that indicate flows, e.g., from 0% to full flow in, e.g., 5 reference locations. 0%; 20%; 30%; 50%; and 100%. The scale can be skewed toward the lower flow range, such that between open and 50% requires less travel of the slide plate.

Figure 4:
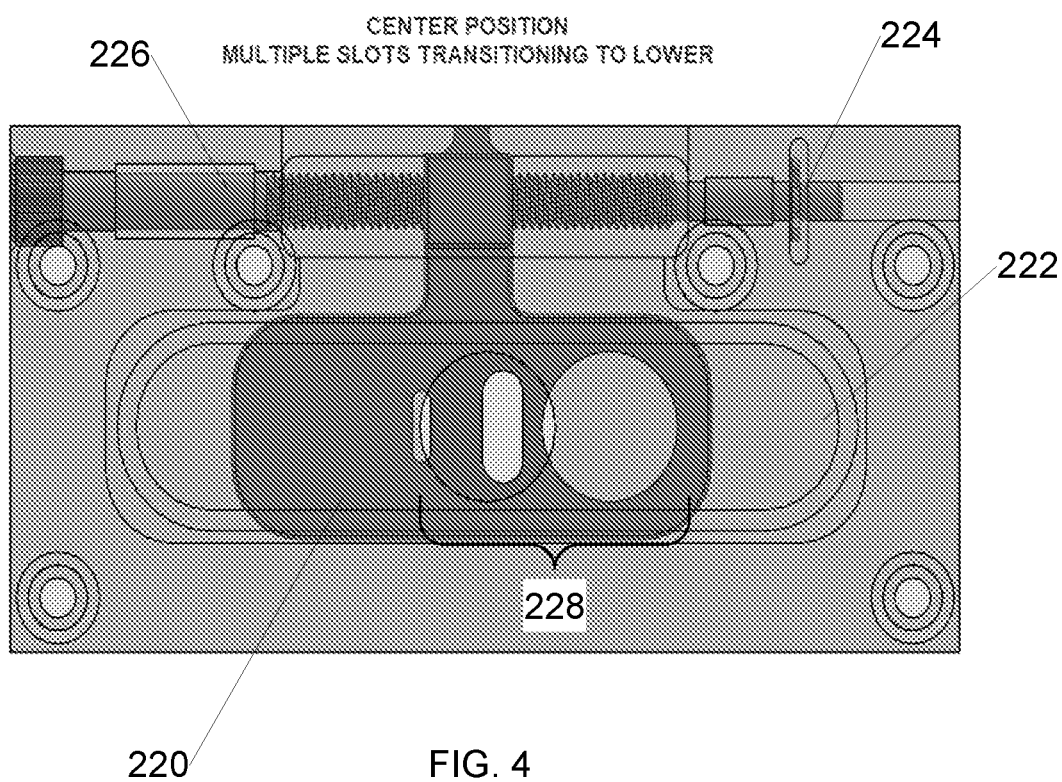
FIG. 4 illustrates the internal components of the valve of FIG. 3, according to an example embodiment.

FIG. 4 illustrates the internal components of valve 200. As can be seen, slider plate 220 is coupled with bolt 226. The slider plate 220 comprises holes of different size and shape to meter the flow as it moves through ports 206. Bolt 226 can be modified to provide bearing support both at near and far end of threaded area and can be held in place with a retainer clip 224. The central area between front and back plates 204 and 202 can be sealed at the perimeter of the sliding plate 220 using O-rings on both sides. This limits the area of the upstream pressure reducing the force to hold the two halves together and prevents water seepage out of the modified bolt area.

The cut-away view of FIG. 4 shows the slide plate 220 choking down flow from round to slotted holes. Moving plate 220 further to right blocks the water flow path to near shut off, although the valves disclosed herein generally should not be used as shut off valves. Orifice thru holes 228 can be formed to have a close approximation of % flow at a nominal pressure ~100 psi.

Figure 5:
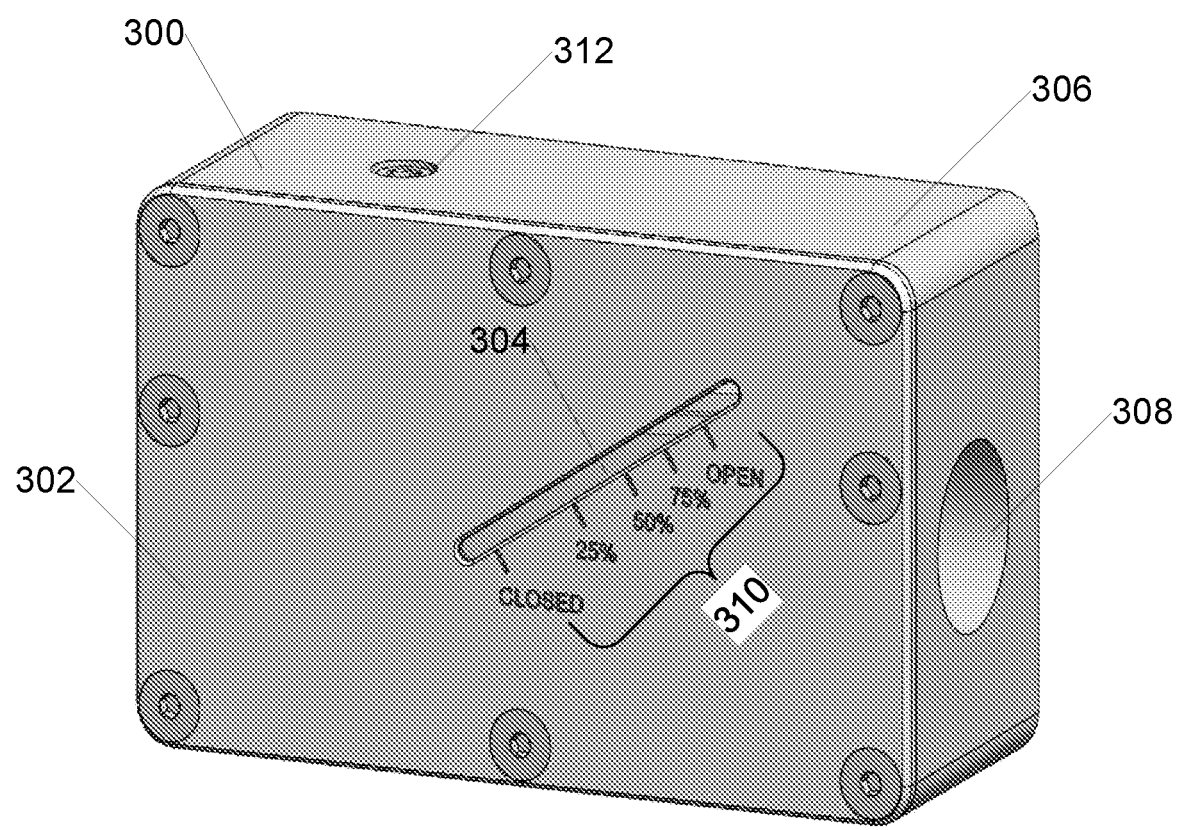
FIG. 5 illustrates a variable flow, adjustable valve in accordance with another example embodiment.

FIG. 5 illustrates a variable flow, adjustable valve 300 in accordance with another example embodiment. Valve 300 uses a restricting paddle that pivots into the flow path via a screw 312 accessed, e.g., on top of valve 300. The paddle edge can be visible through a opening 304 in side plate 302. The opening can be covered or filled by a glass or other clear material. The side plate can, e.g., be engraved from open to closed with, e.g., 3 specific graduations in between providing reference points for fine tuning by user. Screw 312 can be configured to, e.g., rotate 30 revolutions between open and closed. Ports 308 (one on each of the left and the right) in housing 306 can be taped for NPT threads or with straight thread adapters.

Figure 6A:
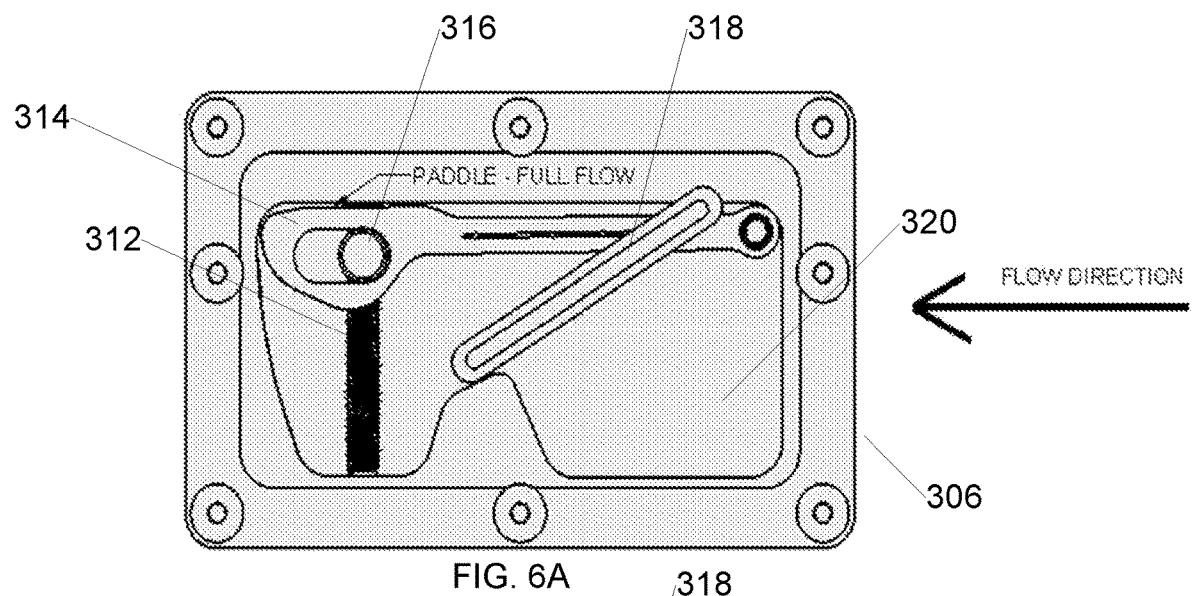
FIGS. 6A and B illustrate the internal components of the valve of FIG. 5, according to an example embodiment.
Figure 6B:
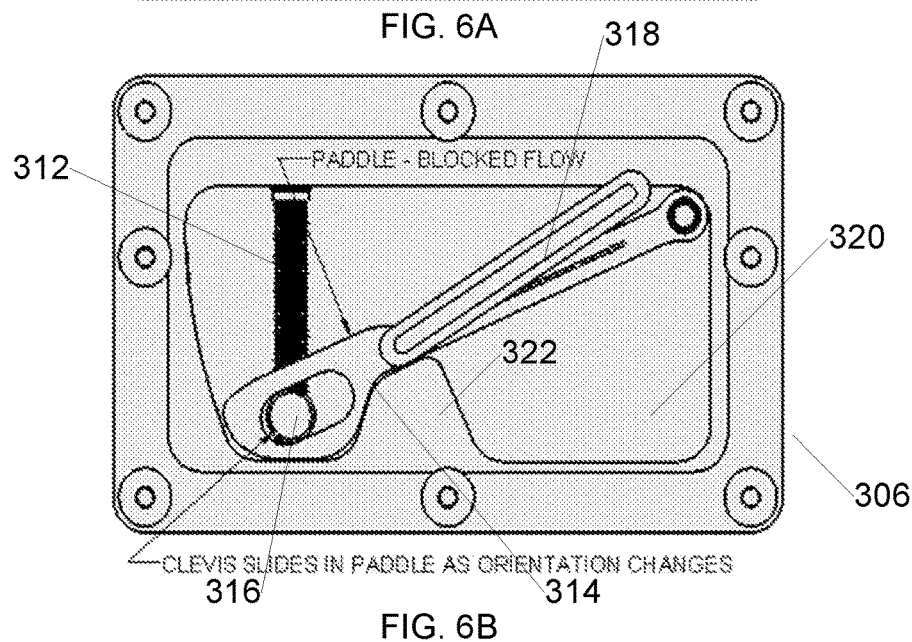

FIGS. 6A and B illustrate the internal components of the valve 300, according to an example embodiment. As can be seen, housing 308 can have a cavity 320 to house the internal components. A, e.g., socket-head cap screw 312 coupled, e.g., via a retainer clip 316 with paddle linkage 314 can be used to swing the paddle 318 from a hinged point across the flow path. Linkage 314 can have a slot and paddle 218 can be coupled with linkage 314, e.g., via a clevis, such that the coupling point can slide via the slot as the linkage is moved up and down. When open, the paddle 318 position is in open location, and the e.g., clevis is in, in this example, on far right of the slot (FIG. 6A). When closed (FIG. 6B), the, e.g., clevis is on the left.

Floor bump up 322 provides added turbulence in the lower flow settings providing more restriction than the simple area of flow path. This will vary with upstream pressure and downstream head pressure. Making the ability for adjustment to individual installations more significant.

In certain embodiments, any of the valves disclosed herein, or any adjustable valve used to restrict the and optimize the flow of water can incorporate a wireless systems, such as described below, to form a smart valve system. Sensors can be interfaced with the system, such as via I/O interface 235 (FIG. 8). The sensors can be configured to sense the flow rate. This information can then be, e.g., displayed on the valve via display (not shown) also included in the valve and/or communicated to a platform as described with respect to FIG. 7. Platform 110 can then make store the information and present to an application 132 running on a user system 130, such as a computer, laptop, tablet, smartphone, or other smart device. In certain embodiments, user system 130 can alternatively, or also communicate directly with the wireless system 200 in such a smart valve implementation, e.g., via. RFID, Bluetooth, or some other short range wireless communication capability. If the data is sent to an application 132 on a user system 130, then a display may not be needed on the smart valve.

In certain embodiments, the system 200 can be configured to change the flow, e.g., via motor(s) that can drive the adjustment mechanism. Thus, the user can be presented with the information on their system 130 and can control the valve via application 132 communicating with system 200.

In certain embodiments, other sensors can be interfaced with smart valve system, such as pressure to sense the pressure in the main line, temperature sensors, humidity sensors, etc. Data from these other sensors can also be provided to application 132, either directly or via a platform 110. This data can also be used by a user to control the flow. For example, if it his hot out, and possibly with low humidity, then the user may water their landscaping, more and therefore may want a higher flow rate. Whereas if it is cold (and possibly raining), then less water may be needed and the user can select a lower flow rate. In fact, data form external systems 140, such as a weather forecast, can be used to program a flow rate schedule. A flow rate schedule can also be based on time, e.g., in the morning (and/or evening) when everyone is taking a shower/bathing, or when the laundry is typically being done, etc., may call for a higher flow rate than the rest of the day.

Figure 7:
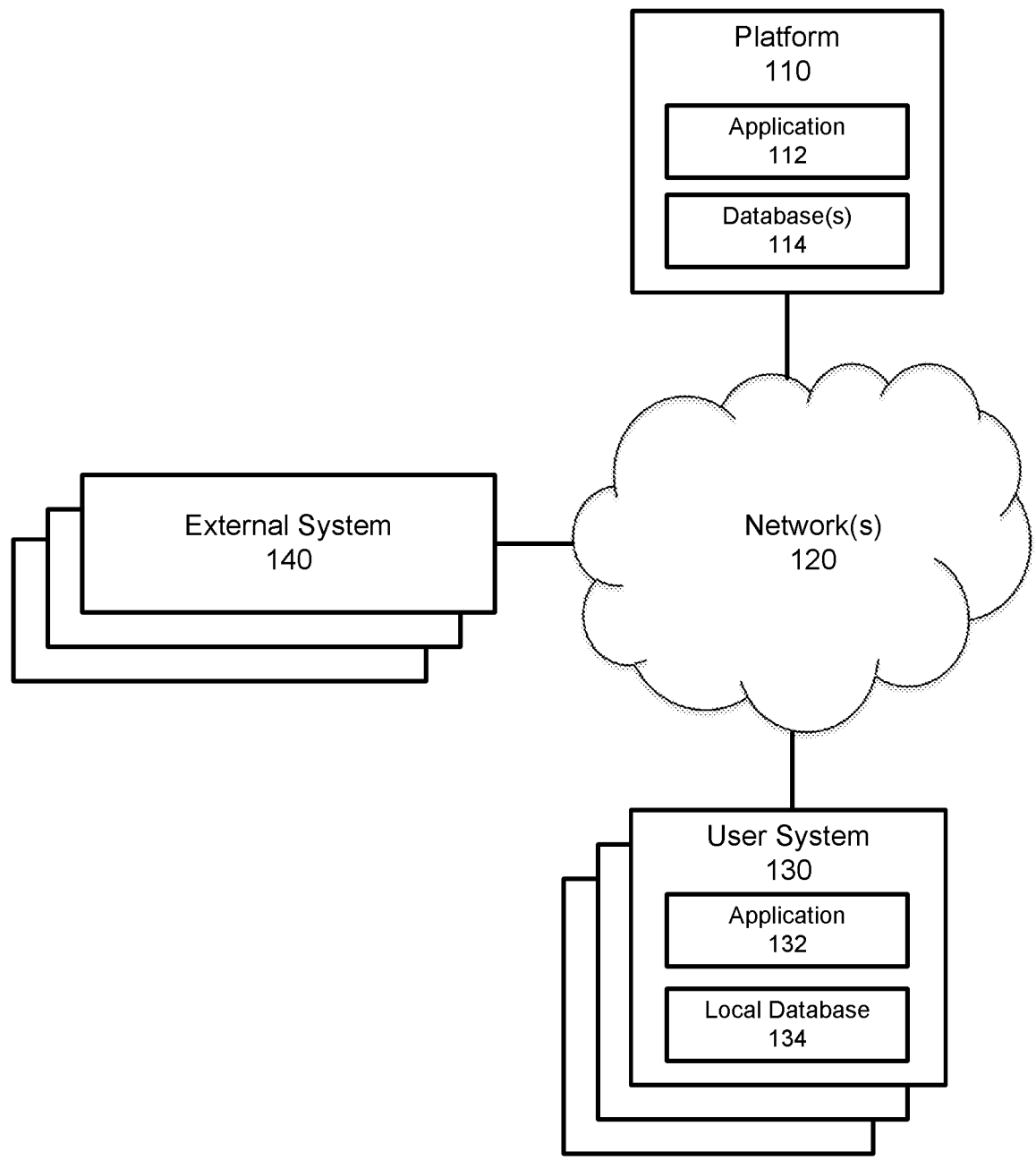
FIG. 7 illustrates an example infrastructure in which one or more of the disclosed processes may be implemented, according to an embodiment.
Figure 8:
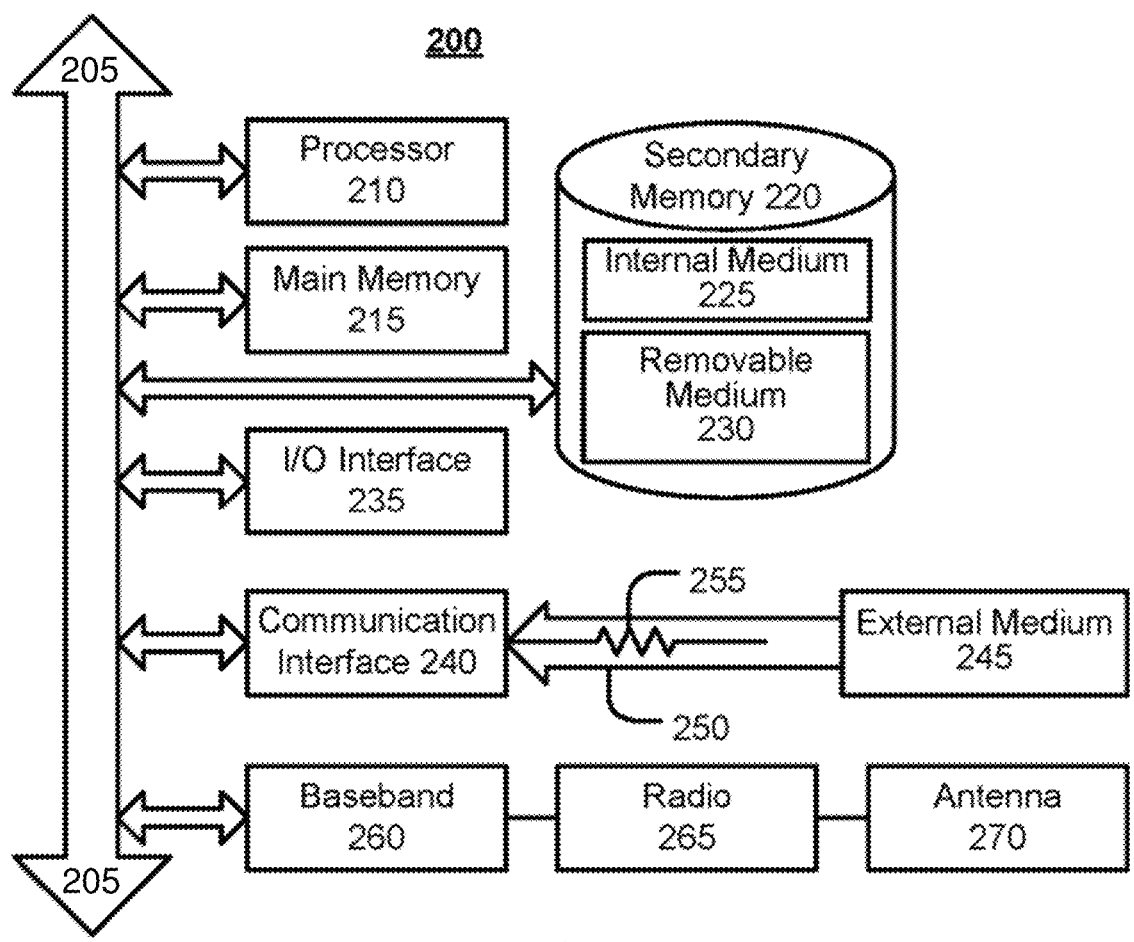
FIG. 8 is a block diagram illustrating an example wired or wireless system that may be used in connection with various embodiments described herein.

FIG. 7 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to execute one or more or a portion of one or more of the various functions, processes, methods, and/or software modules described herein. In an embodiment, client application 132 may utilize a local database 134 for storing data locally on user system 130. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions of the application described herein.

FIG. 8 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, a smart valve system as described above, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network. (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

While the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A smart valve system, comprising:
an adjustable flow valve comprising an upstream port, a downstream port, and a flow restriction mechanism in a flow of water from the upstream port to the downstream port configured to variably restrict the flow;
a wireless communication module;
one or more flow rate sensors configured to sense a flow rate through the adjustable flow valve; and
a processor coupled to the adjustable flow valve, the wireless communication module, and the one or more flow rate sensors;
the processor configured to adjust the current flow rate to match the desired flow rate;
wherein the flow restriction mechanism comprises:
 a rotary disc having a water flow opening;
 a main body that houses the rotary disc;
 a rotating mechanism coupled with the rotary disc and configured to move the water flow opening past a plurality of channels in a flow of water from the upstream port to the downstream port; and
a dial coupled with the rotating mechanism and configured to indicate a valve position between open and closed based on a position of the rotary disc, the dial being oriented transverse to rather than parallel to the rotary disc,
wherein the adjustable flow valve further comprises: a lid positioned on top of the main body so as to position the dial above the rotary disc; an upstream portion that couples with the upstream port and that includes the plurality of channels; and a downstream portion that couples with the downstream port.

2. A smart valve system, comprising:
an adjustable flow valve comprising an upstream port, a downstream port, and a flow restriction mechanism in a flow of water from the upstream port to the downstream port configured to variably restrict the flow;
a wireless communication module;
one or more flow rate sensors configured to sense a flow rate through the adjustable flow valve; and
a processor coupled to the adjustable flow valve, the wireless communication module, and the one or more flow rate sensors;
the processor configured to adjust the current flow rate to match the desired flow rate;
wherein the flow restriction mechanism comprises:
 a rotary disc having a water flow opening;
 a main body that houses the rotary disc;
 a rotating mechanism coupled with the rotary disc and configured to move the water flow opening past a plurality of channels in a flow of water from the upstream port to the downstream port; and
a dial coupled with the rotating mechanism and configured to indicate a valve position between open and closed based on a position of the rotary disc, the dial being oriented transverse to rather than parallel to the rotary disc,
wherein the adjustable flow valve further comprises: a dial lock configured to lock a position of the rotating mechanism.

3. A smart valve system, comprising:
an adjustable flow valve comprising an upstream port, a downstream port, and a flow restriction mechanism in a flow of water from the upstream port to the downstream port configured to variably restrict the flow;
a wireless communication module;
one or more flow rate sensors configured to sense a flow rate through the adjustable flow valve; and
a processor coupled to the adjustable flow valve, the wireless communication module, and the one or more flow rate sensors;
the processor configured to adjust the current flow rate to match the desired flow rate;
wherein the flow restriction mechanism comprises:
 a rotary disc having a water flow opening;
 a main body that houses the rotary disc;
 a rotating mechanism coupled with the rotary disc and configured to move the water flow opening past a plurality of channels in a flow of water from the upstream port to the downstream port; and
a dial coupled with the rotating mechanism and configured to indicate a valve position between open and closed based on a position of the rotary disc, the dial being oriented transverse to rather than parallel to the rotary disc,
wherein the dial includes dial graduations indicating the valve position between open and closed, and the dial is large enough such that the rotating mechanism can be located under the dial.

* * * * *